C. L. BURDICK.
PROCESS OF AND APPARATUS FOR TREATING GAS MIXTURES CONTAINING OXIDS OF NITROGEN.
APPLICATION FILED JAN. 29, 1919.
1,339,494.
Patented May 11, 1920.
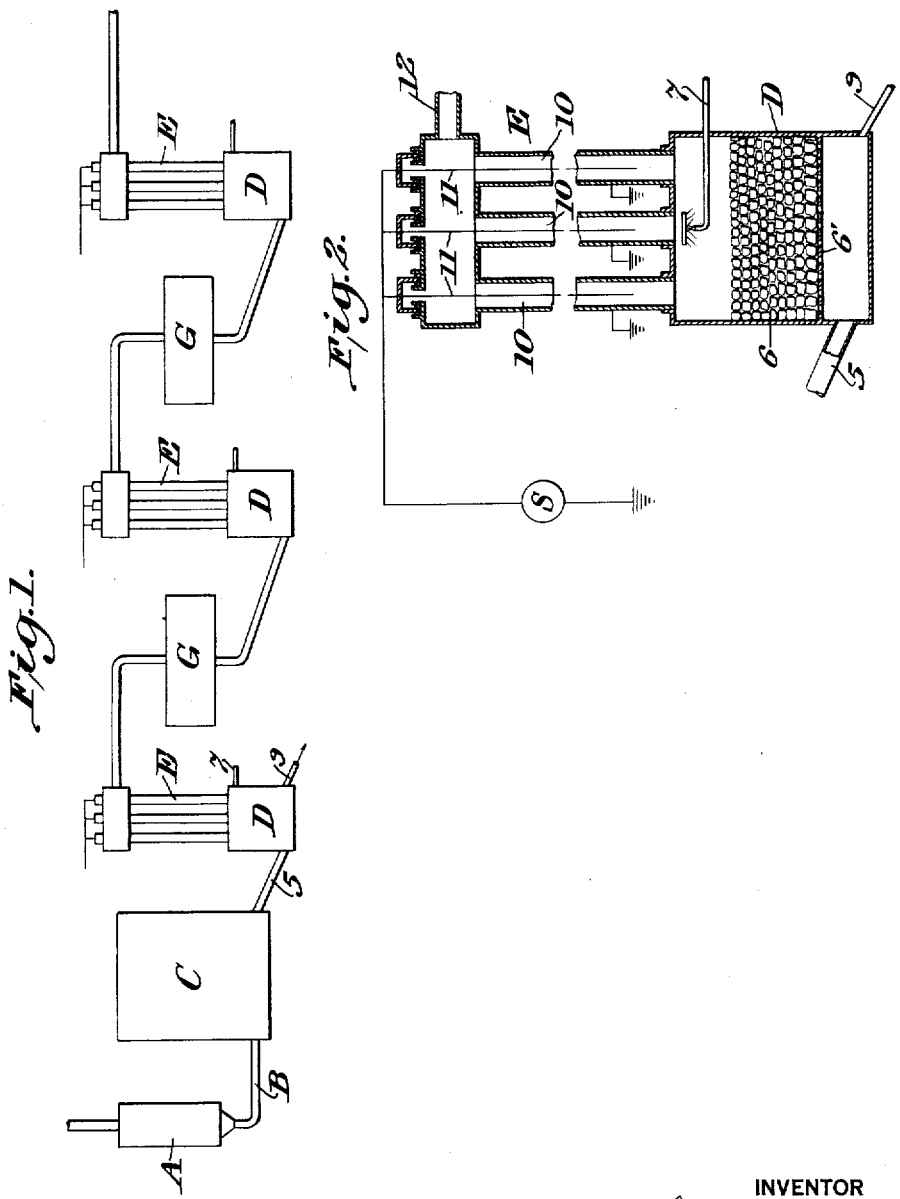
INVENTOR
Charles L. Burdick
BY
Byrnes Townsend & Breckenridge
ATTORNEYS

UNITED STATES PATENT OFFICE.

CHARLES L. BURDICK, OF SHEFFIELD, ALABAMA.

PROCESS OF AND APPARATUS FOR TREATING GAS MIXTURES CONTAINING OXIDS OF NITROGEN.

1,339,494.  Specification of Letters Patent.  Patented May 11, 1920.

Application filed January 29, 1919. Serial No. 273,805.

*To all whom it may concern:*

Be it known that I, CHARLES L. BURDICK, a citizen of the United States, residing at Sheffield, in the county of Colbert and State of Alabama, have invented certain new and useful Improvements in Processes of and Apparatus for Treating Gas Mixtures Containing Oxids of Nitrogen, of which the following is a specification.

This invention relates to the absorption of nitrogen oxids and more particularly to the formation of nitric acid or derived compound of nitrogen by the absorption in water, or aqueous solutions of nitric acid or derived compound, of the oxids of nitrogen. In its broad aspect, the invention involves certain improvements in the process for the treatment of nitrogen oxids with a view to facilitating and expediting the conversion of such oxids into more suitable forms or compositions for commercial utilization. More particularly, the invention involves an improved process of and apparatus for preparing nitric acid or nitrates from gas mixtures containing oxids of nitrogen, and more especially the lower oxids of nitrogen, such as nitric oxid (NO).

Gaseous mixtures containing one or more of the oxids of nitrogen may result from various operations, as for example, from the catalytic oxidation of ammonia, from the fixation of atmospheric nitrogen by the arc process, from the gas effluents obtained from nitric acid manufacture or from organic nitrating operations, and so on. In the preparation of nitric acid from such gaseous mixtures it is the general practice to absorb the oxid or oxids of nitrogen in water or in a dilute solution of nitric acid. In an application for Letters Patent of the United States filed September 19, 1918, Serial Number 254,770 by A. A. Noyes and C. L. Burdick the advantages of effecting this absorption of the oxids of nitrogen in two stages or steps, rather than in a single stage or step, as had heretofore been the practice were pointed out. Thus, in accordance with the invention described and claimed in the aforementioned application, the absorption of the gaseous mixture containing one or more oxids of nitrogen is accomplished in two stages, in the first of which the lower oxids are largely converted into nitrogen dioxid or peroxid ($NO_2$) by catalytic oxidation, for example by means of highly adsorptive carbonaceous materials, such as cocoanut-charcoal or the like; and in the second of which the nitrogen peroxid is converted into nitric acid by hydrolysis. The chemical reactions involved in these two stages may for convenience be expressed by the following equations:

1 (Oxidation) $2NO + O_2 = 2NO_2$.
2 (Hydrolysis) $3NO_2 + H_2O = 2HNO_3 + NO$.

The nitrogen peroxid ($NO_2$) produced by the oxidation of nitric oxid (NO), upon reaction with an aqueous medium, forms a certain quantity of nitric acid and liberates one-half as much nitric oxid (NO). Because of this cyclic reversion of a portion of the nitrogen peroxid to nitric oxid and because of the relative slowness of its oxidation to nitrogen peroxid, the complete removal or recovery of nitrogen oxids is rather difficult. Likewise, because of the slowness of the first (oxidation) reaction, the size and complication of apparatus is necessarily greater than for a simple solution reaction.

As described in my aforementioned application, an effective catalyzer having been discovered for the first or oxidation reaction, it is in many cases found to be advisable to distinguish between the two reactions and cause them to occur in separate parts of the recover apparatus. The two component parts of such a two-stage apparatus may be characterized as (1) chambers for the removal of nitrogen oxids, as such or as compounds thereof, and (2) catalytic chambers for the oxidation of lower oxids of nitrogen. Preferably, the complete recovery apparatus includes a plurality of such two-component parts and the gaseous mixture is repeatedly subjected to the two-stage operations of catalytic oxidation and hydrolysis until the recovery of the nitrogen oxids is substantially complete. For the sake of convenience, I shall throughout the remainder of this specification refer to the gaseous mixture containing nitrogen oxids in its passage through the recover apparatus as nitrous gases.

In the technical treatment of nitrogen oxids, it is found that there is a considerable formation of a mist of aqueous acid or solution in the nitrous gases, which is very difficult of absorption or removal. This mist is due to the presence of a medium in the nitrous gases at a concentration greater than that corresponding to the saturated vapor value of the substance comprising the medium at the temperature in question. This mist is entrained in the nitrous gases and may form a very substantial part of the total nitrogen oxids present in the same. Moreover, as the mist is already in the state of nitric acid, or derived compound of nitrogen, its passage through the reaction chambers and flues of the apparatus is needless and undesirable. Furthermore, if intermediate catalytic chambers are employed, in accordance with the invention of the aforementioned application, it is in general necessary to vaporize this mist before the catalyst will assume activity. This mist vaporization is attended by the actual destruction of the nitric acid already formed, substantially in accordance with the following equation:

$$2HNO_3 + NO = H_2O + 3NO_2.$$

My studies and investigations have shown that in the presence of nitric oxid (NO), nitric acid vapor ($HNO_3$) in the gaseous phase may practically be said to be completely unstable, the nitric oxid reducing the acid vapor almost quantitatively to nitrogen peroxid ($NO_2$). A case is thus possible where, although at normal temperatures, quantities of nitric oxid are present in a given gas, yet as the temperature is raised and the entrained mist is vaporized, the nitric acid vapor is destroyed by reduction and a corresponding amount of nitric oxid (NO) is converted into nitrogen peroxid ($NO_2$), so that as an end result, the gaseous mixture may contain substantially only nitrogen peroxid, or even a mixture of nitrogen peroxid and nitric acid vapor. In a case like this, it will be evident that it is perfectly pointless to pass the gas mixture through a nitric oxid-nitrogen peroxid (NO-$NO_2$) catalyst. As an example, a gas containing say 2% mist, 1% $NO_2$ and 1% NO, on vaporization of the mist, would yield a gas containing substantially 4% $NO_2$.

Summarizing the preceding discussion, the reasons why it is desirable that the entrained mist be excluded or removed from the nitrous gases may be briefly stated as follows:

1. Increasing the efficiency of the absorption device and
2. Increasing the effectiveness of the catalyst by
   (a) maintaining the NO concentration at its full cold-gas value;
   (b) lowering its operation temperature because of the necessity of previously vaporizing a less quantity of mist.

The present invention involves, in the treatment of gas mixtures containing one or more of the oxids of nitrogen, the removal of any mist entrained in the gaseous mixture by design or as a result of any preceding step in the process of treatment. This removal of the entrained mist can be accomplished in a variety of ways, for example, by producing within the gaseous mixture a discharge of high potential electrical energy, (electrostatic precipitation) or by a centrifugal device, etc. Thus, considering my present invention in connection with the two-stage absorption process described in the aforementioned application, the nitrous gases passing from absorption chamber to catalytic chamber are cleaned and freed from mist by precipitation, filtration, or the like, such precipitation being for example accomplished by an electrical precipitator, which may be of known type.

In a system embodying the present invention, the catching or removal of the entrained mist is preferably partially accomplished by the ordinary absorption or scrubbing tower and more directly by the mist precipitator. There is thus a division of labor between the two devices, and this partitionment may be extended to the extent of eliminating one or the other of the two devices. As the limiting case of the present invention, the absorption unit may be completely eliminated, and its functions assumed by the precipitating unit or precipitator.

The following example will illustrate the work accomplished by an absorption unit and a precipitating unit operated in accordance with the principles of the present invention. A gas mixture containing 1.4% of nitric acid in the form of mist, 0.9% $NO_2$, and 1.4% NO was passed through a small absorption tower in which 33% nitric acid was circulating. At the exit of the tower the composition of the gaseous mixture was 0.6% nitric acid mist, and 0.7% $NO_2$ and 1% NO. The tower had accomplished the removal of somewhat more than one-half of the mist. Electrical precipitation of the remaining mist gives an additional recovery of nearly 16% of the total nitrogen oxids, and enables the delivery to the subsequent catalytic chamber of a gaseous mixture which requires little warming, or, under suitable circumstances none at all, the heat of reaction being sufficient to maintain the proper temperature.

Where the duty of removal of nitrogen oxids is shifted completely to the precipitating unit or precipitator, the problem becomes one of mist creation and its subsequent precipitation. My researches have shown that the rate of reaction, represented by the following equation $$3NO_2 + H_2O = 2HNO_3 + NO$$

is very rapid. The acid in the mist entrained in the nitrous gas is, with respect to the above reaction, at a concentration substantially in equilibrium with the nitrogen oxids in the vapor phase. The production of an aqueous mist in a nitrous gas then results in the formation of nitric acid substantially of equilibrium concentration, and brings about a decrease in the degree of oxidation of the nitrogen oxids in the vapor phase due to the relative increase in nitric oxid concentration. The mist may be precipitated, the nitrogen oxids brought largely to the state of nitrogen peroxid ($NO_2$) by contact with the catalyst, and the mist production and precipitation processes repeated. The mists may be produced in a variety of ways, for example, by 1. Cooling the gases below the dew point of the entrained water.
2. Direct introduction of steam.
3. Atomization apparatus.
4. Spray nozzles.
5. Scrubbing with aqueous solutions, and so on.

Steam or mist may also be introduced before the catalyst, as a means of controlling its acidity.

One form of apparatus illustrative of the foregoing principles, and suitable for the carrying out of the improved absorption process of the present invention is shown in the accompanying drawing, in which:

Figure 1 is a diagrammatic view of an absorption system embodying the invention; and Fig. 2 diagrammatically indicates a combination scrubbing and a mist precipitation unit.

Referring to Fig. 1 of the drawings, A represents any suitable source of the oxids of nitrogen, for example, a catalytic chamber for the oxidation of ammonia. The gases emerging from the chamber A at a relatively high temperature (say about 650° C.) are conducted to a reaction compartment C wherein the nitrogen oxids are converted largely to the state of oxidation of nitrogen peroxid. The nitrous gases are preferably cooled in transit through the connecting pipe B to a temperature below 140°–150° C. The gases then enter the first cooling and absorbing chamber D in which, through contact with the aqueous absorbing medium, the heat of the gases is abstracted and condensation of the excess water vapor in the form of acid occurs. The gases pass thence through a mist precipitation apparatus E in which the mist entrained in the gaseous mixture, as a result of the condensation and contact with the aqueous absorption medium, is precipitated out. As previously described, condensation and precipitation may also be simultaneously accomplished by omitting the separate scrubbing or cooling unit. The nitrous gases next pass to the catalytic oxidation chamber G in which the oxidation of nitric oxid to nitrogen peroxid is accomplished. The nitrous gases now pass to the second scrubbing and absorption chamber D, and the sequence of operations of scrubbing, electrical precipitation and oxidation is repeated until the concentration of nitrogen oxids is reduced to the desired degree. In the foregoing description, wherever a scrubbing device is mentioned, it is to be understood that its function may be replaced wholly or in part by a proper mist production device, as previously described. The scrubbing or mist production device may operate with water or aqueous solutions containing acid, such media being recirculated as necessary for efficient operation.

The combined scrubber or absorption chamber and electrical precipitator D—E is represented in greater detail in Fig. 2. The nitrous gases enter this combined unit through a gas inlet 5. The gases pass upwardly through the interstices of a packing material 6 supported on a perforated grate 6' within the chamber D. The aqueous absorbing medium is forced into the chamber D through a pipe 7, and is suitably sprinkled over the top surface of the packing material 6. The liquor, trickling downwardly through the packing material 6 is withdrawn from the absorption chamber D through the liquid outlet 9.

The gases from the absorption chamber D, containing entrained mist as hereinbefore described, pass upwardly through the vertical flues 10. These flues preferably constitute the collecting electrodes of the electrical precipitator. The discharge electrodes 11 of the precipitator are preferably symmetrically disposed within the flues 10, and are insulated for high electrical potentials. The discharge electrodes 11 are connected to the high potential side of any suitable source of high potential direct current energy. Usually the low potential side of this source is grounded and the collecting electrodes 10 are also grounded in order to complete the electrical circuits. In Fig. 2 of the drawings, the source of high potential electrical energy is represented by S, and the ground connection thereof and of the collecting electrodes 10 is represented in the conventional manner. It is to be understood that the discharge of high potential electrical energy within the nitrous gases as they pass upwardly through the flues 10 causes a precipitation of the coalesced mist on the surfaces of the collecting electrodes 10. The liquor thus precipitated on the walls of the collecting electrodes or flues 10 flows down into the absorption unit D and eventually finds its way out of the apparatus through the liquor outlet 9. The gases from the electrical precipitator pass out of the header or manifold at the top of the precipitating unit through a gas outlet 12 to the next adjacent catalytic oxidation chamber G of the system.

What I claim is:

1. The process of treating a gas mixture containing one or more of the oxids of nitrogen which comprises subjecting the gas mixture to catalytic oxidation, absorbing in an aqueous medium the nitrogen peroxid resulting from said oxidation, and removing the mist entrained in the gases resulting from said absorption operation.

2. The process of treating a gas mixture containing one or more of the oxids of nitrogen which comprises subjecting the gas mixture to catalytic oxidation, absorbing in an aqueous medium the nitrogen peroxid resulting from said oxidation, removing the mist entrained in the gases resulting from said absorption operation, and repeating the same operations in the same sequence.

3. The process of treating a gas mixture containing one or more of the oxids of nitrogen which comprises subjecting the gas mixture to catalytic oxidation, absorbing in an aqueous medium the nitrogen peroxid resulting from said oxidation, and removing the mist entrained in the gases resulting from said absorption operation by electrical precipitation.

4. In the process of preparing nitric acid from a gas mixture containing one or more of the oxids of nitrogen, subjecting the gas mixture to a catalytic oxidation, producing in the resulting gas mixture a suspended mist of aqueous nitric acid, and precipitating said mist.

5. In the process of preparing nitric acid from a gas mixture containing one of more of the oxids of nitrogen, producing a suspended mist of aqueous nitric acid within the gas mixture, electrically precipating said mist, and subjecting the resulting gas mixture to catalytic oxidation.

6. The process of preparing nitric acid from a gas mixture containing one or more of the oxids of nitrogen which comprises repeatedly subjecting the gas mixture to substantially the same sequence of operations, each sequence of operations including the production within the gas mixture of a mist containing aqueous nitric acid, the removal of this mist, and the catalytic oxidation of the resulting gas mixture.

7. In a process of treating a gas mixture containing one or more of the oxids of nitrogen, together with a mist composed in part of nitric acid, the steps which consist in removing said mist, and thereafter subjecting the resulting gas mixture to oxidation.

8. An apparatus for treating a gas mixture containing one or more of the oxids of nitrogen, comprising, in combination, a plurality of series connected units, each of said units including a precipitator and a catalytic oxidation chamber.

9. Apparatus for treating a gas mixture containing one or more oxids of nitrogen, comprising, in series connection, means for producing a mist in the gas-mixture, a precipitator for said mist, and a catalytic oxidizer for the mist-free gas.

In testimony whereof I affix my signature.

CHARLES L. BURDICK.

It is hereby certified that in Letters Patent No. 1,339,494, granted May 11, 1920, upon the application of Charles L. Burdick, of Sheffield, Alabama, for an improvement in "Processes of and Apparatus for Treating Gas Mixtures Containing Oxids of Nitrogen," errors appear in the printed specification requiring correction as follows: Page 1, lines 87 and 103, for the word "recover" read *recovery;* page 3, line 26, for the word "acidity" read *activity;* and that the said Letters Patent should be read with these corrections therein that the same may conform to the record of the case in the Patent Office.

Signed and sealed this 8th day of June, A. D., 1920.

[SEAL.]

Cl. 23—1.

M. H. COULSTON,
*Acting Commissioner of Patents.*